United States Patent
Yutaka

(10) Patent No.: US 12,416,734 B2
(45) Date of Patent: Sep. 16, 2025

(54) REAL TIME DYNAMIC SATELLITE POSITIONING SYSTEM AND POSITIONING METHOD

(71) Applicant: RIKA INC., Okinawa (JP)

(72) Inventor: Masato Yutaka, Okinawa (JP)

(73) Assignee: RIKA INC. (JP)

( * ) Notice: Subject to any disclaimer, the term of this patent is extended or adjusted under 35 U.S.C. 154(b) by 0 days.

(21) Appl. No.: 18/563,725

(22) PCT Filed: Jan. 25, 2022

(86) PCT No.: PCT/JP2022/002546
§ 371 (c)(1),
(2) Date: Nov. 22, 2023

(87) PCT Pub. No.: WO2022/249540
PCT Pub. Date: Dec. 1, 2022

(65) Prior Publication Data
US 2024/0241271 A1    Jul. 18, 2024

(30) Foreign Application Priority Data
May 26, 2021   (JP) ................. 2021-088249

(51) Int. Cl.
*G01S 19/43* (2010.01)
*G01S 19/04* (2010.01)

(52) U.S. Cl.
CPC ............. *G01S 19/43* (2013.01); *G01S 19/04* (2013.01)

(58) Field of Classification Search
CPC ................. G01S 19/04; G01S 19/43
See application file for complete search history.

(56) References Cited

U.S. PATENT DOCUMENTS 4,241,352 A * 12/1980 Alspaugh ............ H01Q 9/0407
                                                    333/261
5,151,706 A *  9/1992 Roederer ................ H01Q 3/40
                                                    342/372
(Continued)

FOREIGN PATENT DOCUMENTS

CN     103711050 A  *  4/2014
JP     200192745 A      4/2001
(Continued)

OTHER PUBLICATIONS

R.C. Johnson, Antenna Engineering Handbook, Third Edition, McGraw-Hill, p. 1-4 (Year: 1993).*
(Continued)

*Primary Examiner* — Ladimir Magloire
*Assistant Examiner* — Fred H Mull
(74) *Attorney, Agent, or Firm* — Lerner David LLP

(57) ABSTRACT

A satellite positioning system with a short initialization processing time and a high fix rate in a Real Time Kinematic satellite positioning system. The Real Time Kinematic satellite positioning system has a mobile station of a user and a transmitting station installed on the ground, and performs positioning using Internet satellites flying above the sky. The mobile station, the transmitting station, and a predetermined Internet satellite are connected to each other by an IPsec-VPN. The positioning system obtains an atomic clock time from the GNSS satellite flying above the sky. The transmitting station obtains its own position information from reference point information obtained from a reference station located within 10 km from the transmitting station and orbit information of predetermined Internet satellites.

11 Claims, 10 Drawing Sheets

(56) References Cited

U.S. PATENT DOCUMENTS

| | | | |
|---|---|---|---|
| 6,373,432 | B1 | 4/2002 | Rabinowitz et al. |
| 6,385,647 | B1 | 5/2002 | Willis et al. |
| 10,652,220 | B1 | 5/2020 | Ramanujan |
| 2005/0156782 | A1 | 7/2005 | Whelan et al. |
| 2005/0280569 | A1* | 12/2005 | Park ............... H03M 1/1225 341/155 |
| 2008/0062039 | A1 | 3/2008 | Cohen et al. |
| 2011/0269478 | A1* | 11/2011 | Das ................. H04W 24/00 455/67.11 |
| 2018/0023958 | A1 | 1/2018 | Takahashi |
| 2018/0098247 | A1 | 4/2018 | Gopal et al. |
| 2019/0207747 | A1 | 7/2019 | Durvasula et al. |
| 2020/0333472 | A1* | 10/2020 | Marshall ............. G01S 19/43 |
| 2021/0099933 | A1 | 4/2021 | Matsuda et al. |
| 2021/0194571 | A1 | 6/2021 | Ma et al. |
| 2021/0385877 | A1 | 12/2021 | Matsuda et al. |
| 2022/0294569 | A1 | 9/2022 | Matsuda et al. |

FOREIGN PATENT DOCUMENTS

| | | | |
|---|---|---|---|
| JP | 2001523335 | A | 11/2001 |
| JP | 200671561 | A | 3/2006 |
| JP | 2007524089 | A | 8/2007 |
| JP | 2009515188 | A | 4/2009 |
| JP | 2023508973 | A | 3/2023 |
| WO | 9843372 | A1 | 10/1998 |
| WO | 2005081011 | A2 | 9/2005 |
| WO | 2008048283 | A2 | 4/2008 |
| WO | 2016147569 | A1 | 9/2016 |
| WO | 2019193891 | A1 | 10/2019 |
| WO | 2020202792 | A1 | 10/2020 |
| WO | 2021029296 | A1 | 2/2021 |

OTHER PUBLICATIONS

B.W. Parkinson et al., J.J. Global Positioning System: Theory and Applications, vol. 1; Progress in Astronautics and Aeronautics, vol. 163, American Institute of Aeronautics and Astronautics, Inc., p. 10-11 (Year: 1996).*

L. Breems et al., Continuous-Time Sigma-Delta Modulation for A/D Conversion in Radio Receivers, Kluwer Academic Publishers, p. 9-27, (Year: 2001).*

R.A. Slywczak, Low-Earth-Orbit Satellite Internet Protocol Communications Concept and Design, NASA/TM—2004-212299, https://ntrs.nasa.gov/api/citations/20040045319/downloads/20040045319.pdf (Year: 2004).*

Globalstar, Satellite Technology powered by The Globalstar Satellite Network, https://www.globalstar.com/en-us/about/our-technology (Year: 2020).*

G.D. Krebs, Globalstar M073-103 (Globalstar-2), Gunter's Space Page, https://space.skyrocket.de/doc_sdat/globalstar-2.htm, retrieved May 16, 2024 (Year: 2024).*

Baseline or base line. Academic Press Dictionary of Science and Technology (4th ed.). Elsevier Science & Technology. Credo Reference: https://search.credoreference.com/content/entry/apdst/baseline_or_base_line/0 (Year: 1992).*

Gateway. The American Heritage Dictionary of the English Language (6th ed.). Houghton Mifflin. https://search.credoreference.com/articles/Qm9va0FydGljbGU6NDQxNTUxMw== (Year: 2016).*

Router 2. The American Heritage Dictionary of the English Language (6th ed.). Houghton Mifflin. https://search.credoreference.com/articles/Qm9va0FydGljbGU6NDQ4NDA4NQ== (Year: 2016).*

Virtual private network. In The Macquarie Dictionary (7th ed.). https://search.credoreference.com/articles/Qm9va0FydGljbGU6NDcOMTYxMQ== (Year: 2017).*

Defintion of Multicast. Dictionary of Computing (6th ed.). Bloomsbury. https://search.credoreference.com/articles/Qm9va0FydGljbGU6MzkzNzc4NA== (Year: 2010).*

International Search Report for PCT/JP2022/002546 dated Mar. 29, 2022. 4 pgs.

Kenji Rikitake, "Net connection using satellite communication: Application of multicast advances," Nikkei Computer, Nikkei BP, Jul. 13, 2000, No. 500, pp. 206-209.

Hiroshi Konishi, "Advanced Lecture [1st Session] Satellite Communication Services Entering a New Phase", Nikkei Communication, Nikkei BP, Aug. 3, 1998, No. 275, pp. 166-171.

ICT Workshop, "Information Processing Textbook _ Network Specialist 2019 Edition", First Edition, Shoeisha Co., Ltd., Mar. 13, 2019, pp. 228-236, ISBN: 978-4-7981-5997-3.

Hiroshi Miyata, "Network Design Patterns for Infrastructure/Network Engineers", 1st edition, SB Creative Co., Ltd., Dec. 31, 2015, pp. 328-341, ISBN: 978-4-7973-8284-6.

Socius Japan Co., Ltd., "Thorough Guide to Cisco CCNP Routing & Switching Route Textbook", 1st edition, Impress Co., Ltd., Oct. 21, 2015, pp. 606-617, ISBN: 978-4-8443-3916-8.

Decision of Refusal for Japanese Application No. 2021-088249 mailed Mar. 20, 2023. 4 pgs.

Decision of Patent for Japanese Application No. 2021-088249 mailed August 18, 2023.3. 4 pgs.

Amendment on Appeal filed on Jun. 19, 2023 for Japanese Application No. 2021-088249. 3 pgs.

Appeal filed on Jun. 19, 2023 for Japanese Application No. 2021-088249. 8 pgs.

Rinaldi, Federica; et al., "Non-Terrestrial Networks in 5G & Beyond: A Survey", IEEE Access, Sep. 10, 2020, pp. 165178-165200, DOI: 10.1109/Access. 2020.3022981.

* cited by examiner

| TCP/IP layer model | Protocol | PDU |
|---|---|---|
| Application Layer | DNS, NTP, SNMP | message |
| Transport Layer | UDP | datagram |
| Internet Layer | IPv6 (IPsec-VPN) | packet |
| Network Access Layer | Ethernet | frame |

IPV6 header

| version 4 bits | traffic class 8 bits | flow label 20 bits | |
|---|---|---|---|
| payload length 16 bits | | next header 8 bits | hop limit 8 bits |
| source address 128 bits | | | |
| destination address 128 bits | | | |

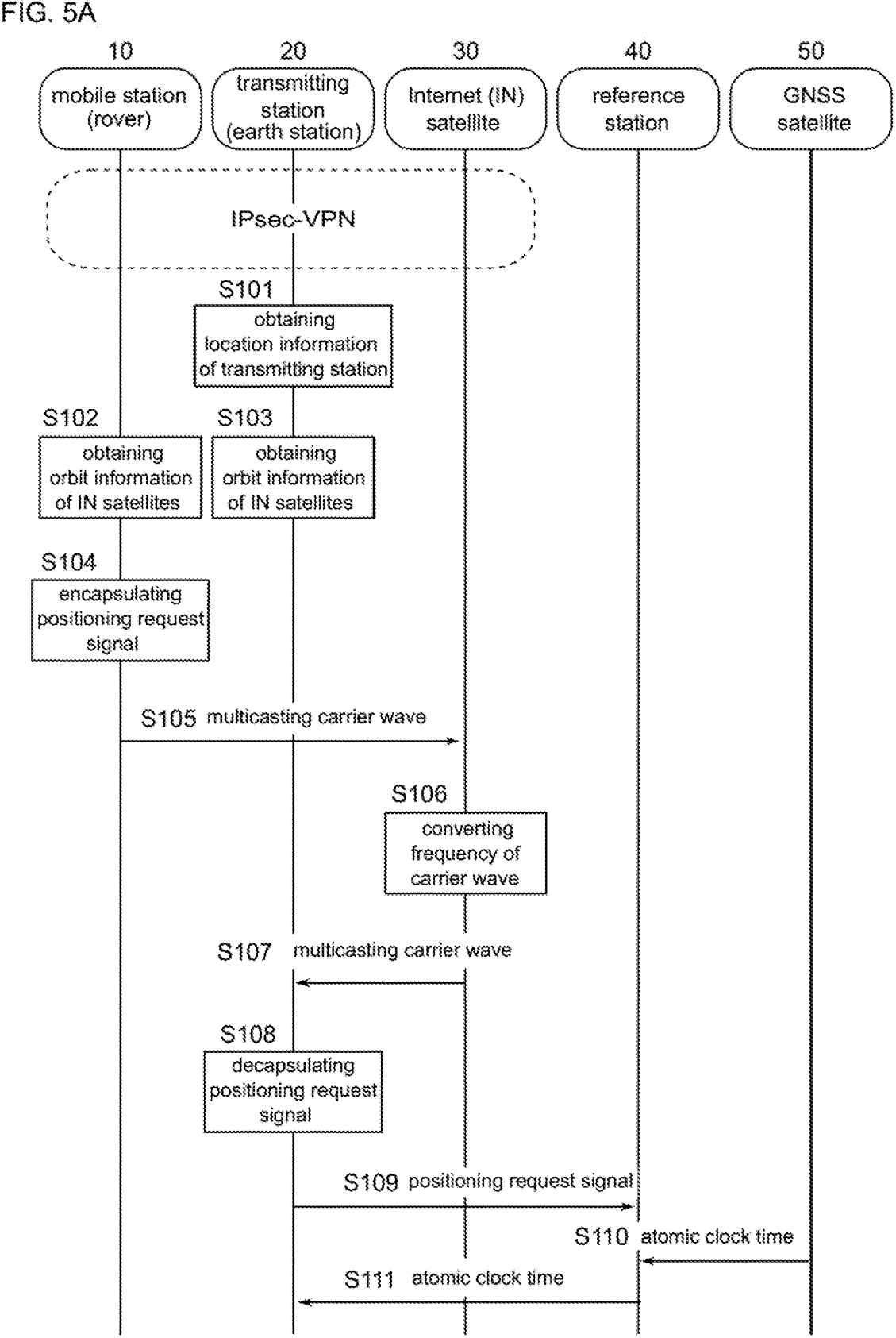

REAL TIME DYNAMIC SATELLITE POSITIONING SYSTEM AND POSITIONING METHOD

CROSS-REFERENCE TO RELATED APPLICATIONS

This application is a national phase entry under 35 U.S.C. § 371 of International Application No. PCT/JP2022/002546 filed Jan. 25, 2022, which claims the priority from Japanese Patent Application No. 2021-088249 filed in the Japanese Patent Office on May 26, 2021, the entire contents of which are hereby incorporated by reference.

TECHNICAL FIELD

The present invention relates to a positioning system using Real Time Kinematic satellite positioning techniques, and more particularly to a satellite positioning system utilizing Internet satellites.

BACKGROUND

Satellites are divided into a low earth orbit satellite having a global orbit of altitude 2,000 km or less, a mid-earth orbit satellite having a global orbit of altitude 2,000 km to 35,786 km, an Earth synchronous orbit satellite having a global synchronous orbit of altitude 35,786 km, and a high earth orbit satellite having a global orbit of altitude 35,786 km or more. The geosynchronous orbit satellite having a circular orbit over the equator is referred to as a geostationary satellite, but the Earth synchronous orbit satellite may be simply referred to as a geostationary satellite.

Applications of mid-earth orbit satellite includes satellite positioning. By way of example, Global Navigation Satellite System (GNSS) is known. GNSS includes the Global Positioning System (GPS) of the United States Department of Defense, Glonass operated by the Russian Aerospace Forces (Soviet Union), Galileo Positioning System built by the European Union, China's BeiDou Satellite Positioning System, India's NavIcy Navigation Satellite System, etc.

The quasi-zenith satellite system of Japan "MICHIBIKI" is a satellite positioning system consisting of a mid-earth orbit satellite with an altitude of 33,000 to 39,000 km. The satellite has an inclined stationary orbit that draws an 8-shaped North-South symmetry at approximately the top of Japan (quasi-zenith). Japan's technology demonstration satellite "KIZUNA" is an Internet satellite with a geostationary orbit at an altitude of 36,000 km and a longitude of 43 degrees east, but tests of KIZUNA have been completed.

In recent years, satellite Internet access using a satellite constellation has become known as an application of low earth orbit satellites. A satellite constellation consists of many small polar-orbiting satellites that work together to provide Internet access. In particular, the development of satellite Internet access technology that uses satellite constellations using non-geostationary satellites at an altitude of about 500 km is active.

PRIOR ART LITERATURE

Patent Literature

Patent Document 1: WO 2016/147569

SUMMARY OF THE INVENTION

Problem to be Solved by the Invention

In recent years, Real Time Kinematic GNSS has become known as a high-precision satellite positioning method using GNSS. This is a technology that allows users to accurately determine their position in real time by combining carrier waves from GNSS satellites and location information data from reference points installed on the ground. Reference points include electronic reference points of the Geospatial Information Authority of Japan, reference points independently set by telecommunications carriers, etc.

Factors affecting the accuracy of Real Time Kinematic GNSS positioning include delay error due to ionosphere or troposphere, satellite orbit error, clock error due to errors of a precision clock installed on the satellite or receiver, inaccuracy of the position of the reference point, etc.

Since conventional Real Time Kinematic GNSS positioning uses complex processing to remove various errors, the time and fix rate of the initialization processing was not a satisfactory value.

It is an object of the present invention to provide a satellite positioning system with a short initialization processing time and a high fix rate in a Real Time Kinematic satellite positioning system.

Means for Solving the Problem

According to an embodiment of the present invention,
in a Real Time Kinematic satellite positioning system that has a mobile station of a user and a transmitting station installed on the ground, and performs positioning using Internet satellites flying above the sky, the transmitting station may comprise:
a signal processing section of transmission system that generates a transmission datagram, the transmission datagram including a transmission data, the transmission data including orbit information of predetermined Internet satellites, location information of the transmitting station and atomic clock time;
a baseband section of transmission system that digitally modulates the transmission datagram to generate an intermediate frequency carrier wave;
a front end section of transmission system that frequency converts the intermediate frequency carrier wave to generate a high frequency carrier wave; and
an antenna of transmission system that multicasts the high frequency carrier wave toward the predetermined Internet satellites; and the mobile station may comprise:
an antenna of reception system that receives a high frequency carrier wave, the high frequency carrier wave being multicast from the predetermined Internet satellites;
a front end section of reception system that converts the frequency of the high-frequency carrier wave to an intermediate frequency;
a baseband section of reception system that digitally demodulates the intermediate frequency carrier wave to generate a received datagram; and
a signal processing section of reception system that calculates the position of the mobile station from the received datagram.

According to an embodiment of the invention,
in the Real Time Kinematic satellite positioning system, the signal processing section of reception system may comprise:

a phase counter that calculates a phase difference of the intermediate frequency carrier waves from the received datagram;

a router of reception system that inputs the received datagram and outputs a received IP packet;

a decapsulation unit that decapsulates the received IP packet and extracts a received data, the received data including the orbit information of the predetermined Internet satellites, the location information of the transmitting station and the atomic clock time; and a positioning calculator that calculates the position of the mobile station based on the received data and the phase difference of the received carrier waves.

According to an embodiment of the invention, in the Real Time Kinematic satellite positioning system, the signal processing section of transmission system may comprise:

an encapsulation unit that encapsulates the transmission data to generate a transmission IP packet; and a router of transmission system that inputs the transmission IP packet and outputs the transmission datagram.

According to an embodiment of the invention, in the Real Time Kinematic satellite positioning system, the mobile station, the transmitting station, and the predetermined Internet satellites may be connected to each other by IPsec-VPN.

According to an embodiment of the invention, in the Real Time Kinematic satellite positioning system, the atomic clock time may be obtained from a GNSS satellite flying above the sky.

According to an embodiment of the invention, in the Real Time Kinematic satellite positioning system, the predetermined Internet satellites may include at least four Internet satellites and may be non-geostationary low Earth orbit satellites, the non-geostationary low Earth orbit satellites constituting a satellite constellation consisting of a plurality of satellites.

According to an embodiment of the invention, in the Real Time Kinematic satellite positioning system, the digital modulation may be binary phase shift keying (BPSK).

According to an embodiment of the invention, in the Real Time Kinematic satellite positioning system, the transmitting station may obtain its own location information from reference point information and orbit information of the predetermined Internet satellites, the reference point information being obtained from a reference station within 10 km from the transmitting station.

According to an embodiment of the invention, in the Real Time Kinematic satellite positioning system, the orbit information of the predetermined Internet satellites may be orbit information calculated in real time by an orbit tracking station on the ground.

According to an embodiment of the invention, in the Real Time Kinematic satellite positioning system, the frequency band of the carrier waves may be the Ku band.

According to an embodiment of the invention, in a Real Time Kinematic satellite positioning method that has a user's mobile station and a transmitting station installed on the ground, and performs positioning using Internet satellites flying above the sky, the positioning method may comprise:

a step of generating, by the transmitting station, a carrier wave including a transmission data, the transmission data including orbit information of predetermined Internet satellites, location information of the transmitting station and atomic clock time, and multicasting, by the transmitting station, the carrier wave toward the predetermined Internet satellites;

a step of converting, by the predetermined Internet satellites, the frequency of a carrier wave multicast from the transmitting station from an uplink frequency to a downlink frequency;

a step of multicasting, by the predetermined Internet satellites, the carrier wave converted to the downlink frequency to the mobile station;

a step of extracting, by the mobile station, a received data including the location information of the transmitting station, the orbit information of the predetermined Internet satellites and the atomic clock time from a carrier wave multicast from the predetermined Internet satellites;

a step of calculating, by the mobile station, a phase difference of the carrier waves, the carrier waves being multicast from the predetermined Internet satellites; and a step of calculating, by the mobile station, the position of the mobile station from the received data and the phase difference of the carrier waves.

According to an embodiment of the invention, in the Real Time Kinematic satellite positioning method, the mobile station, the transmitting station, and the predetermined Internet satellites may be connected to each other by IPsec-VPN, and the predetermined Internet satellites may include at least four Internet satellites and may be non-geostationary low Earth orbit satellites, the non-geostationary low Earth orbit satellites constituting a satellite constellation consisting of a plurality of satellites.

According to an embodiment of the invention, in the Real Time Kinematic satellite positioning method, the atomic clock time may be obtained from a GNSS satellite flying above the sky.

According to an embodiment of the invention, in the Real Time Kinematic satellite positioning method, the frequency band of the carrier waves may be the Ku band.

Effect of the Invention

In accordance with the present invention, a satellite positioning system with a short initialization processing time and a high fix rate in a Real Time Kinematic satellite positioning system can be provided.

BRIEF DESCRIPTION OF THE DRAWINGS

FIG. 5A is a diagram illustrating a portion of the operation of the Real Time Kinematic satellite positioning system according to the present embodiment.

DETAILED DESCRIPTION OF THE INVENTION

Figure 1A:
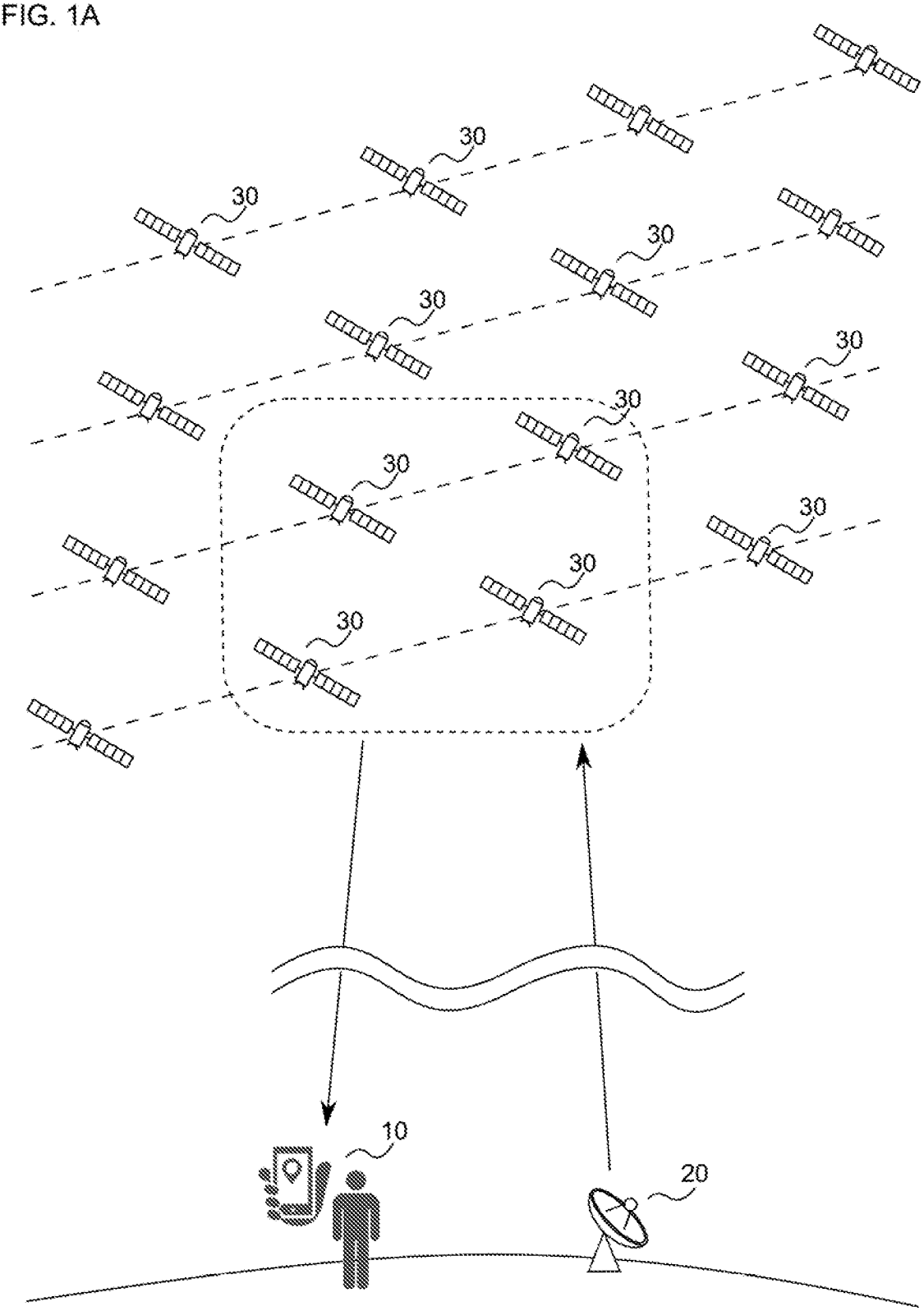
FIG. 1A is a schematic diagram illustrating a configuration example of a Real Time Kinematic satellite positioning system according to the present embodiment.

Embodiments of the present invention will now be described in detail with reference to the accompanying drawings. In the drawings, the same reference numerals are given to the same element, and the overlapped explanation is omitted.

With reference to FIG. 1A, an example of a Real Time Kinematic satellite positioning system according to the present invention will now be described. The positioning system of the present example comprises a user's mobile station (rover) 10 and a transmitting station (earth station) 20 that multicasts a carrier wave toward Internet satellites 30 flying above the sky. The Real Time Kinematic satellite positioning method is called differential GPS method (interferometry positioning method) and uses at least four Internet satellites 30.

The Internet satellites 30 are not limited to any satellite that has the capability to provide an Internet connection. However, in the present embodiment, the Internet satellites 30 preferably constitute a satellite constellation consisting of a number of non-geostationary satellites, and may be low earth orbit satellites or medium earth orbit satellites, and more preferably, non-geostationary low Earth orbit satellites.

In the present embodiment, the carrier wave used for Internet satellite communication is the radio wave of the microwave band. In the present embodiment, any of the L-band (1.6/1.5 GHz), the S-band (2.6/2.5 GHz), the C-band (6/4 GHz), the Ku-band (14/12 GHz) and the Ka-band (30/20 GHz) may be used, but preferably the Ku-band (14/12 GHz) is used. The carrier wave is a modulated wave in which a navigation message and code information (C/A code, P code) are carried on a sine wave. Generally, when the frequency is low, the propagation loss is small, but a wide band cannot be secured. On the other hand, when the frequency is high, a wide band can be secured, but the propagation loss is large.

Figure 1B:
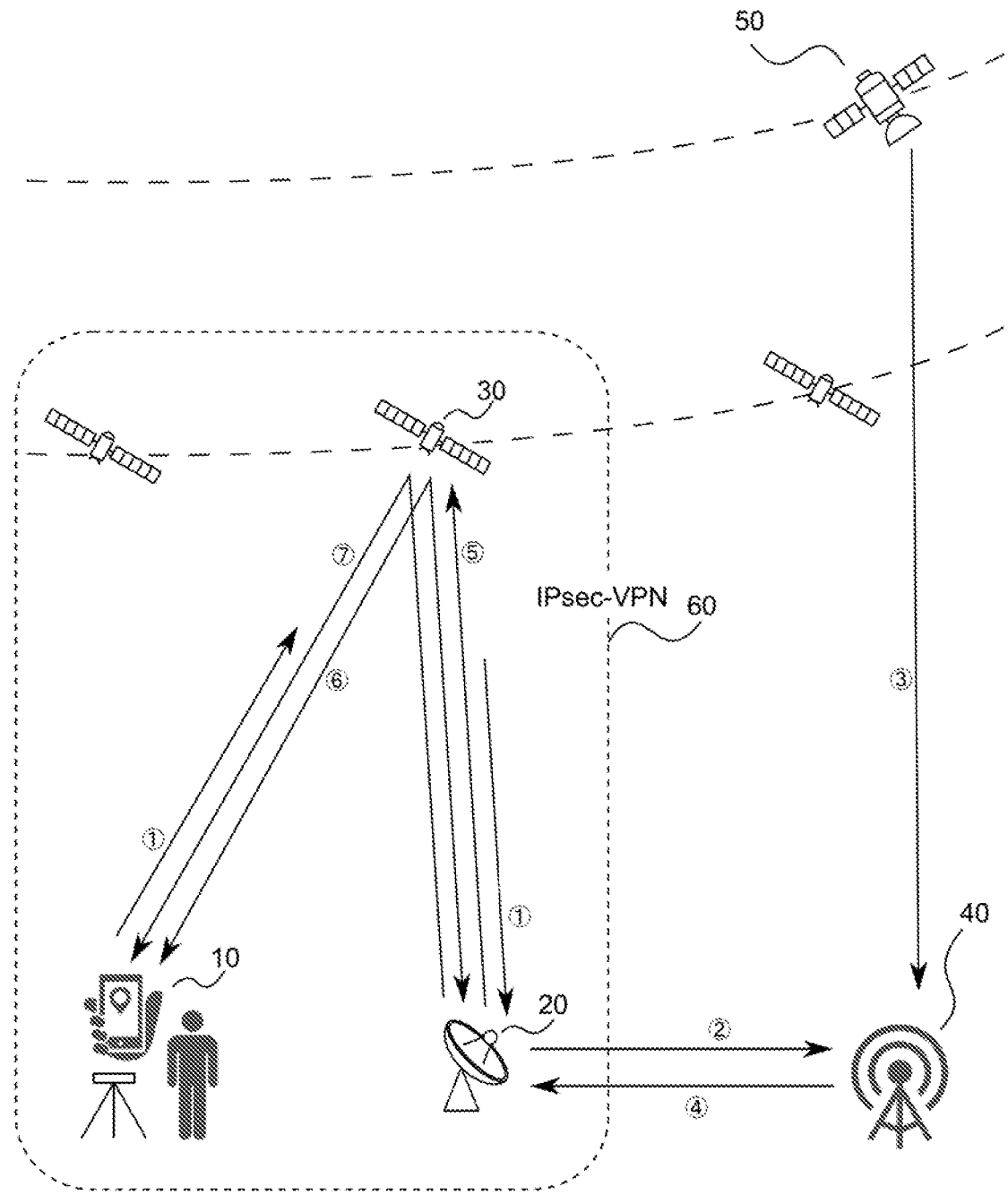
FIG. 1B is a schematic diagram illustrating a configuration example of a Real Time Kinematic satellite positioning system according to the present embodiment.

With reference to FIG. 1B, an exemplary configuration of a Real Time Kinematic satellite positioning system according to the present invention will be described. According to this embodiment, the reference point of the reference station 40 may be used to determine the location of the transmitting station (earth station) 20. Hereinafter, the location information of the reference point is simply referred to as the location information of the reference station 40. According to this embodiment, the distance between the mobile station 10 and the transmitting station 20 is less than or equal to 10 km. The distance between the transmitting station 20 and the reference station 40 is less than or equal to 10 km. Both of the mobile station 10 and the reference station 40 are within 10 km of the periphery of the transmitting station 20. Further, according to the present embodiment, the atomic clock time provided by the GNSS satellite 50 is used. The reference station 40 obtains an atomic clock time from the GNSS satellite 50 and transmits the atomic clock time to the transmitting station 20.

In the present embodiment, the mobile station 10, the transmitting station 20 and the Internet satellites 30 are connected to each other by an IPsec-VPN (Security Architecture for Internet Protocol-Virtual Private Network). Multicast is used for data transmission between the mobile station 10, the transmitting station 20, and the Internet satellites 30. Multicast is a technique in which a sender (source) simultaneously transmits one packet (data) to a particular plurality of recipients. In multicast, routers at network junctions duplicate a single packet and forward the duplicated packets to many receivers. Therefore, the network can be efficiently utilized.

The information required for Real Time Kinematic satellite positioning according to the present invention is three data, that is, the orbit information of the Internet satellites 30, the location information of the transmitting station 20 and the atomic clock time. The three information will now be described in detail.

First, the orbit information of the Internet satellites 30 will be explained. The orbit information includes a "rough almanac" with an accuracy of several kilometers, a "broadcast almanac (ephemeris)" with an accuracy of about 2 meters, and a "precision almanac" with an accuracy of 10 cm or less.

The "rough almanac" and the "broadcast almanac" are orbit information included in the navigation message transmitted from the Internet satellites 30. The mobile station 10 and the transmitting station 20 obtain navigation messages from the Internet satellites 30 via IPsec-VPN.

"Precision almanac" is orbit information calculated based on observation signals at orbit tracking stations on the ground. An example is the IPG almanac provided by the international GPS service. The IPG almanac includes a plurality of almanacs such as a super-breaking almanac, a breaking almanac, and a final almanac. These almanacs include those that are obtained in real time but with slightly lower accuracy, and those that are highly accurate but are obtained several days later.

The orbit information is preferably highly accurate and obtained in real time. If such conditions are met, the orbit information may be a "broadcast almanac", but may be a "precision almanac". In the present embodiment, orbit information obtained directly from the Internet satellites 30 may be used, but orbit information obtained from a ground station may be used.

The orbit of a satellite is represented by the position coordinates of the satellite expressed in three-dimensional coordinates of the Earth's centroid system. The Earth's centroid system is a three-dimensional orthogonal coordinate system whose origin is the Earth's center of gravity. As the Earth's centroid system, the International Earth Reference Coordinate System constructed by the International Earth Rotation Observation Project is known.

The location information of the transmitting station 20 will now be described. In the present embodiment, the transmitting station 20 maintains its own accurate and up-to-date location information. The transmitting station 20 may obtain its own location information independently, or may obtain its own location information of the transmitting station 20 based on the location information of the reference point obtained from the reference station 40. As mentioned above, the mobile station 10 and the reference station 40 are within 10 km from the transmitting station 20.

Reference points in Japan may be 1,300 or more electronic reference points nationwide established by the Geospatial Information Authority of Japan, or may be reference points independently established by communication companies, etc. In North America, reference points may be obtained by WGS84 (World Geodetic System, 1984) by the U.S. National Geospatial-Intelligence Agency. In Europe, reference points may be obtained from the European Geodetic Data (European Datum 1950).

Finally, the atomic clock time will be described. The GNSS satellite 50 broadcasts an atomic clock time at predetermined time intervals. The GNSS satellite 50 may be any medium earth orbit satellite that provides an atomic clock time, for example, any satellite selected from Global Positioning System (GPS), Glonass, Galileo Global Navigation Satellite Positioning System, BeiDou Satellite Positioning System, NavIcy Navigation Satellite System or the like. The atomic clock time may be a time obtained by a cesium atomic clock based on international atomic time.

The positioning system of the present embodiment uses the atomic clock time provided by the GNSS satellite 50. In the present embodiment, the mobile station 10, the transmitting station 20, and the reference station 40 have synchronized and therefore identical atomic clock times. Therefore, it is possible to eliminate atomic clock errors caused by the mobile station 10, transmitting station 20, and reference station 40 having different atomic clock times.

For example, the reference station 40 transmits the atomic clock time obtained from the GNSS satellite 50 to the transmitting station 20. The transmitting station 20 transmits the atomic clock time to the mobile station 10 via Internet satellites 30. Instead of the reference station 40 receiving an atomic clock time from the GNSS satellite 50, the transmitting station 20 may receive an atomic clock time from the GNSS satellite 50. In this case, it is not necessary for the reference station 40 to transmit the atomic clock time to the transmitting station 20.

Figures 2A, 2B:
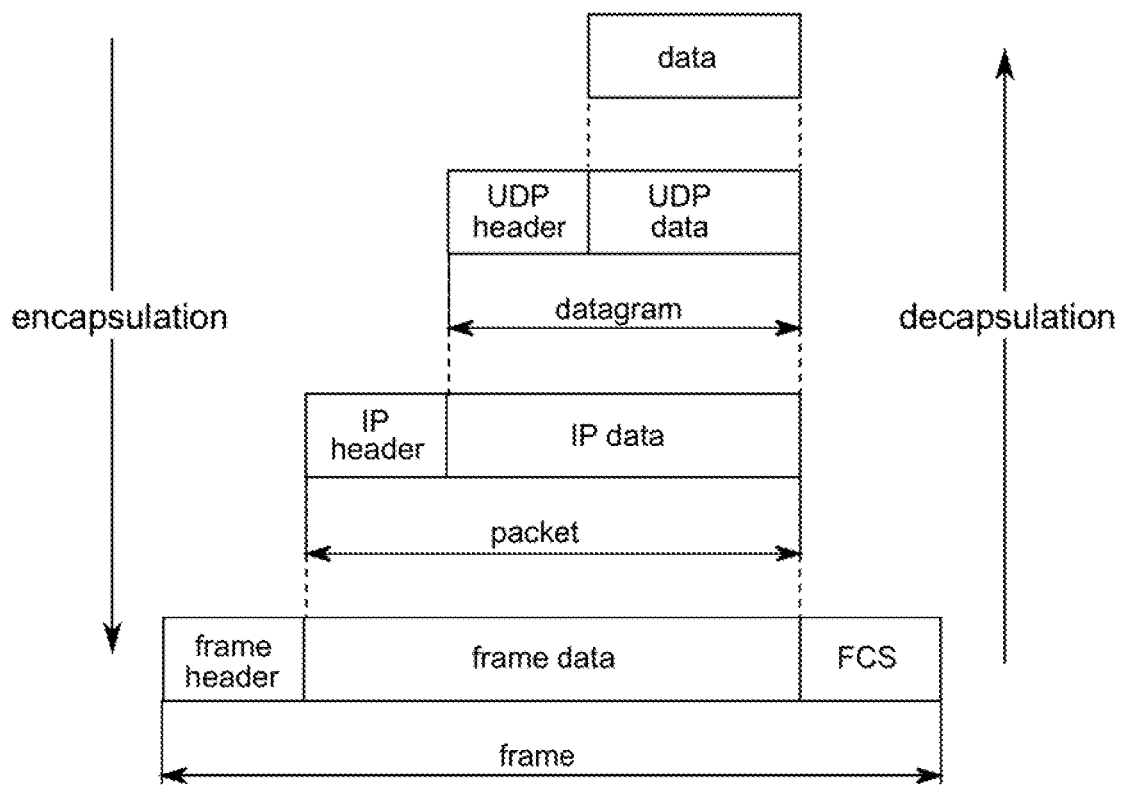
FIG. 2A is a diagram illustrating an example of a communication protocol used for multicast in the present embodiment.
FIG. 2B is a diagram illustrating an example of a configuration of a protocol data unit used for multicast in the present embodiment.

With reference to FIG. 2A, an example of a communication protocol used for multicast in the present embodiment will be described. As the application layer protocol, DNS (Domain Name System), NTP (Network Time Protocol), SNMP (Simple Network Management Protocol), etc. may be used. The application layer protocol data unit is sometimes called a message. As the transport layer protocol, UDP (User Datagram Protocol) may be used. The transport layer protocol data unit is usually called a segment, but in UDP called a datagram or UDP packet.

As the Internet layer protocol, IPv6 and IPsec (Security Architecture for Internet Protocol) may be used. The protocol data unit of Internet layer is simply called a packet or IP packet. Since IPsec is an Internet layer encryption protocol, confidentiality of packet can achieved even if the packet is not encrypted in the higher layer, such as transport layer or application layer protocols. Ethernet may be used as the network access layer protocol. The protocol data unit of the network access layer is called a frame. The method of transmitting IP packets using Ethernet is called IPoE (IP over Ethernet).

Multicast is a communication method that simultaneously transmits one piece of data to multiple parties belonging to a "multicast group" by simply specifying one destination address. IPv4 (Internet Protocol Version 4) uses IGMP (Internet Group Management Protocol) as a multicast group management protocol, while IPv6 uses MLD (Multicast Listener Discovery). MLD is a protocol for managing participants in multicast groups in IPv6, and has a function to search for multicast receivers (listeners).

According to this embodiment, an IPsec-VPN is formed. IPsec-VPN is a virtual private network that uses IPsec. Therefore, even when using a public network such as the Internet, a secure communication network can be realized by implementing IPsec. IPsec includes an authentication header (AH), an encapsulation of a security payload (ESP: Encapsulation Security Payload), and a key exchange protocol (IKE: Internet Key Exchange).

With reference to FIG. 2B, an example of a configuration of a protocol data unit (PDU) in the present embodiment will be described. The datagram is generated by adding a UDP header to the application layer data. The packet is generated by adding an IP header to the datagram. The IP header includes an IP address. The frame is generated by adding a frame header and an FCS (Frame Check Sequence) to the packet. In the Ethernet, the frame header includes a MAC (Media Access Control) address.

Figure 3:
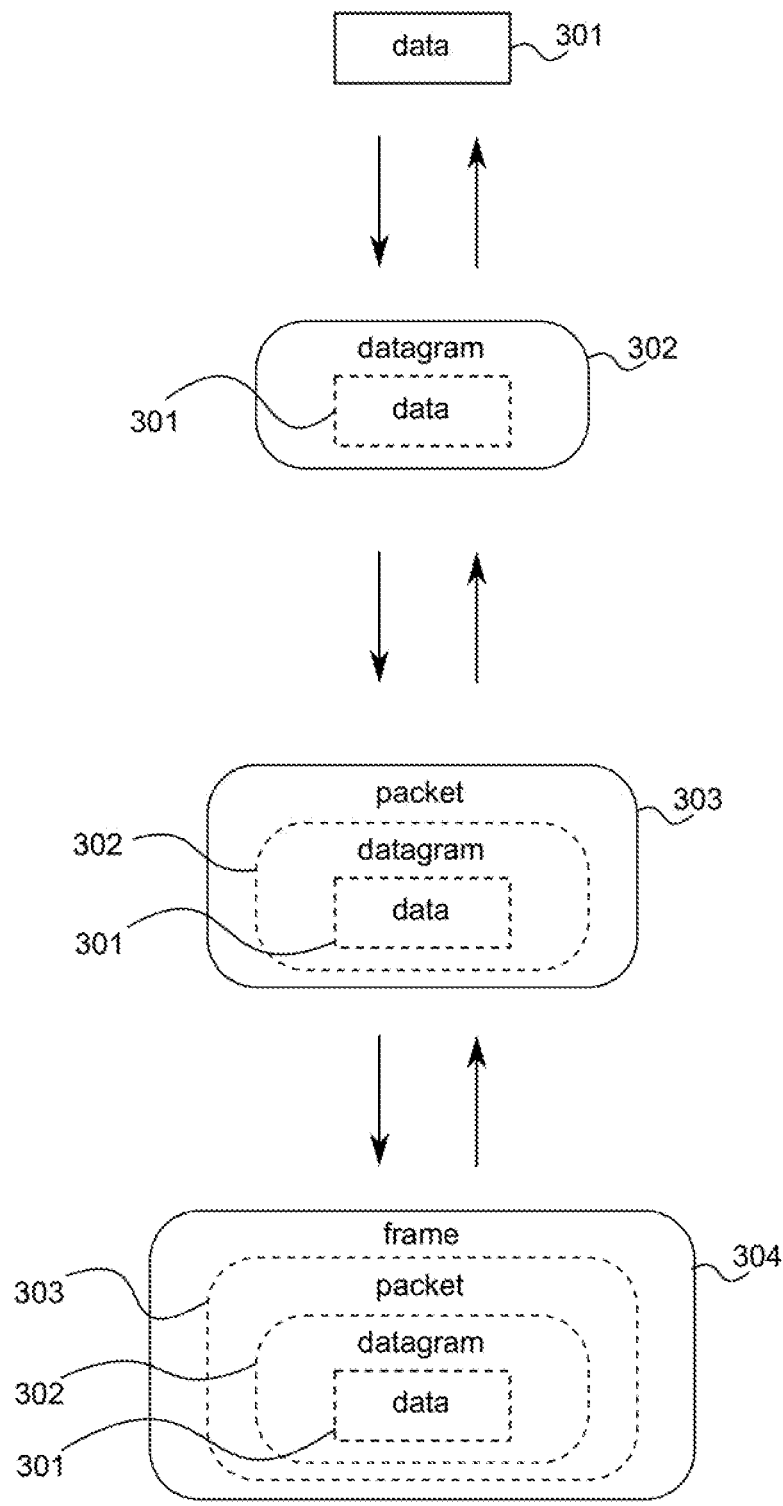
FIG. 3 illustrates an example of encapsulation and decapsulation of data in the present embodiment.

With reference to FIG. 3, an example of encapsulation and decapsulation of data in the present embodiment will be described. A datagram 302 is generated from the transmission data 301, a packet 303 is generated from the datagram 302, and a frame 304 is generated from the packet 303. Each such process is referred to as encapsulation. Conversely, packet 303 is retrieved from frame 304, datagram 302 is retrieved from packet 303, and data 301 is retrieved from datagram 302. Each such process is referred to as decapsulation.

Figures 4A, 4B:
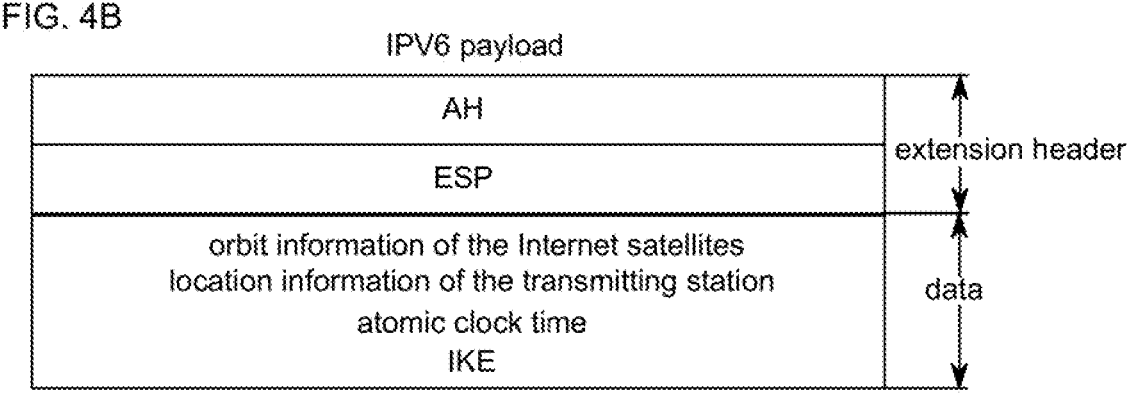
FIG. 4A is a diagram illustrating a data structure of an IPv6 (Internet Protocol Version 6) header in the present embodiment.
FIG. 4B is a diagram illustrating an IPv6 payload data structure in the present embodiment.

With reference to FIG. 4A, a data structure of IPv6 packet header in the present embodiment will be described. The header of the IP packet is read out by the router and is used for routing or sorting packets. The header of the IPv6 packet is a fixed length of 40 bytes. The "version" represents version 6 of IP. The "traffic class" identifies a difference in class of IPv6 packets and a priority. The "flow label" identifies audio and video data to be transmitted in real time. The "payload length" indicates the total number of bytes of the data and the extension header. The "next header" is a protocol number that represents the type of information following the IPv6 header. The "hop limit" limits the maximum number of routers that can pass. Each time a packet passes through the router, the hop limit is subtracted one by one. When the hop limit reaches zero, the packet is discarded and a hop limit excess is returned to the source. The "source address" is the source IP address and the "destination address" is the destination IP address.

With reference to FIG. 4B, a data structure of IPv6 packet payload in the present embodiment will be described. The payload consists of an extension header and data. The AH (Authentication Header) performs authentication of the data and authentication of the source of the packet. The ESP (Encapsulation Security Payload) has a data authentication function, a packet source authentication and encryption function.

The data includes the orbit information of the Internet satellites 30, the location information of the transmitting station 20, the atomic clock time and IKE (Internet Key Exchange). IKE is a key exchange protocol that safely exchanges key information. AH, ESP and IKE are IPsec protocols.

Figure 5B:
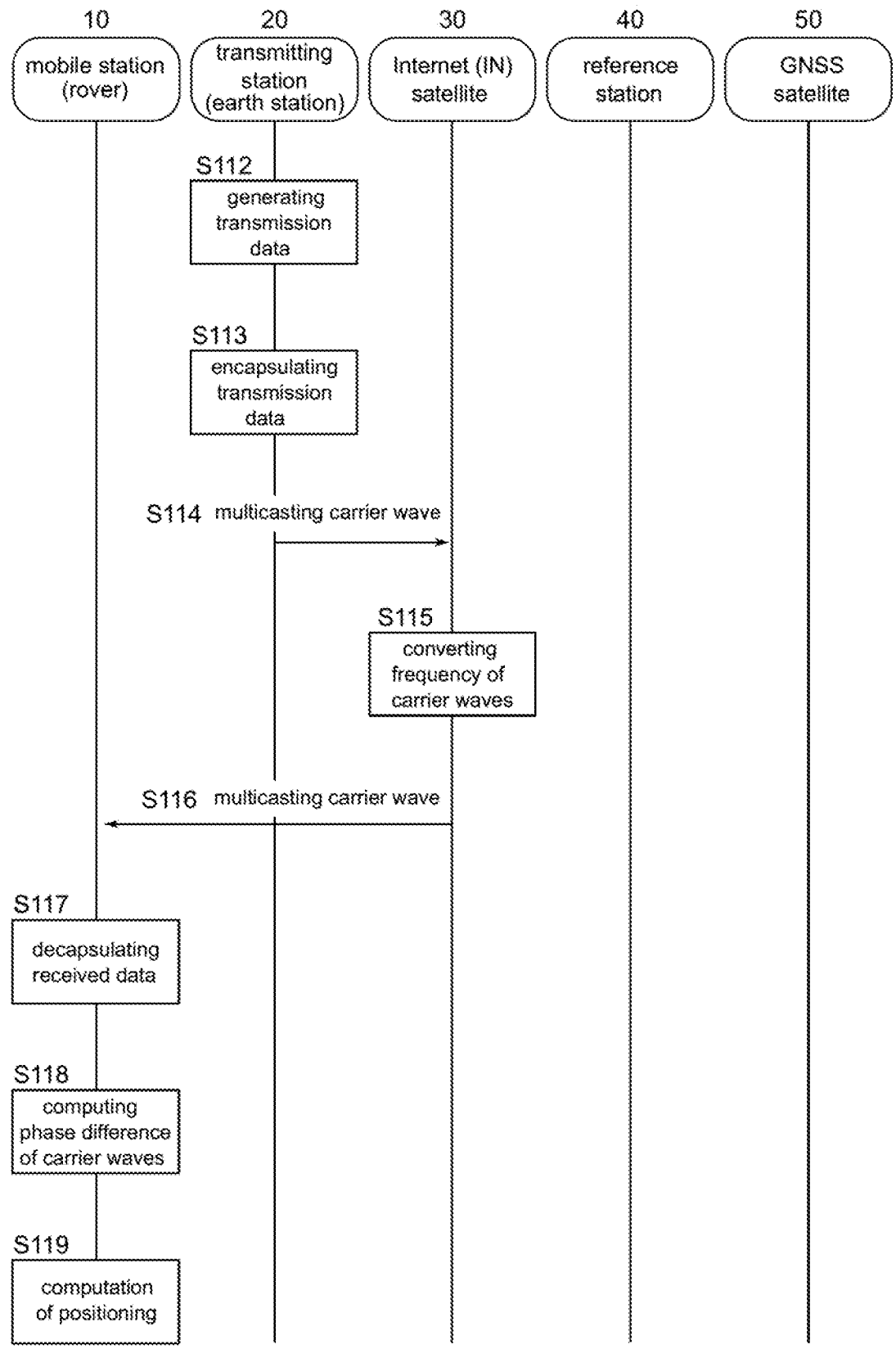
FIG. 5B is a diagram illustrating a portion of the operation of the Real Time Kinematic satellite positioning system according to the present embodiment.

With reference to FIGS. 5A and 5B, an example of the operation of a real-time positioning system according to the present invention will be described. It should be noted that the vertical axes attached to the mobile station 10, the transmitting station 20, the Internet (IN) satellite 30, the reference station 40, and the GNSS satellite 50 are indicative of the order of processings and do not necessarily represent time. For example, the processings at reference station 40 and transmitting station 20 may be performed independently. The processings at the Internet satellites 30 may also be performed independently of the processings at the reference station 40 and the mobile station 10.

As shown in FIG. 5A, mobile station 10, transmitting station 20, and at least four Internet (IN) satellites 30 are connected by IPsec-VPN. The transmitting station 20 and the reference station 40 are interconnected by a communication network such as the Internet. In step S101, the transmitting station 20 obtains its own accurate and up-to-date location information. Although the transmitting station 20 may uniquely obtain its own location information, the transmitting station 20 may obtain its own location information based on the location information of the reference points obtained from the reference station 40. In steps S102 and S103, the mobile station 10 and the transmitting station 20 obtain orbit information of the Internet satellites 30 via an IPsec-VPN. From the orbit information, the mobile station 10 selects Internet satellites 30 suitable for user positioning from a number of Internet satellites 30 flying above the sky.

In step S104, the mobile station 10 generates and encapsulates a positioning request signal. The positioning request signal may include an identification number and password of the mobile station 10. The mobile station 10 incorporates the encapsulated positioning request signal into a sine wave to generate a carrier wave. In step S105, the mobile station 10 multicasts the carrier wave toward at least four Internet satellites 30. In step S106, each Internet satellite 30 converts the frequency of the carrier wave from an uplink frequency to a downlink frequency. For example, if the Ku band (14/12 GHz) is used as the carrier wave, each Internet satellite 30 converts the frequency from 14 GHz to 12 GHz.

In step S107, each Internet satellite 30 multicasts the carrier wave. In step S108, the transmitting station 20 receives and decapsulates the carrier wave and retrieves the positioning request signal. In step S109, the transmitting station 20 transmits the positioning request signal to the reference station 40. The transmission from the transmitting station 20 to the reference station 40 may use an existing Internet.

The reference station 40 has obtained orbit information of the GNSS satellites 50 in advance. Therefore, the reference station 40 selects in advance a GNSS satellite 50 suitable for receiving an atomic clock time from a plurality of GNSS satellites 50 flying above the sky. At step S110, the reference station 40 obtains an atomic clock time from the GNSS satellite 50. At step S111, the reference station 40 transmits the atomic clock time to the transmitting station 20.

As shown in FIG. 5B, in step S112, the transmitting station 20 generates a transmission data including the orbital information of each Internet satellite 30, the location information of the transmitting station 20 and the atomic clock time obtained from the GNSS satellite 50. In step S113, the transmitting station 20 encapsulates the transmission data. The transmitting station 20 incorporates the encapsulated transmission data into a sine wave to generate a carrier wave. At step S114, the transmitting station 20 multicasts the carrier wave toward at least four Internet satellites 30.

At step S115, each Internet satellite 30 converts the frequency of the carrier wave from an uplink frequency to a downlink frequency. For example, if the Ku band (14/12 GHz) is used as the carrier wave, each Internet satellite 30 converts the frequency from 14 GHz to 12 GHz. In step S116, each Internet satellite 30 multicasts the carrier wave. In step S117, the mobile station 10 receives and decapsulates the carrier wave and retrieves the received data. The received data includes the orbital information of each Internet satellite 30, the location information of the transmitting station 20 and the atomic clock time.

In step S118, the mobile station 10 computes the phase difference of the carrier waves. In step S119, the mobile station 10 computes the relative position between the transmitting station 20 and the mobile station 10 and obtains its own current location in real time.

Figure 6A:
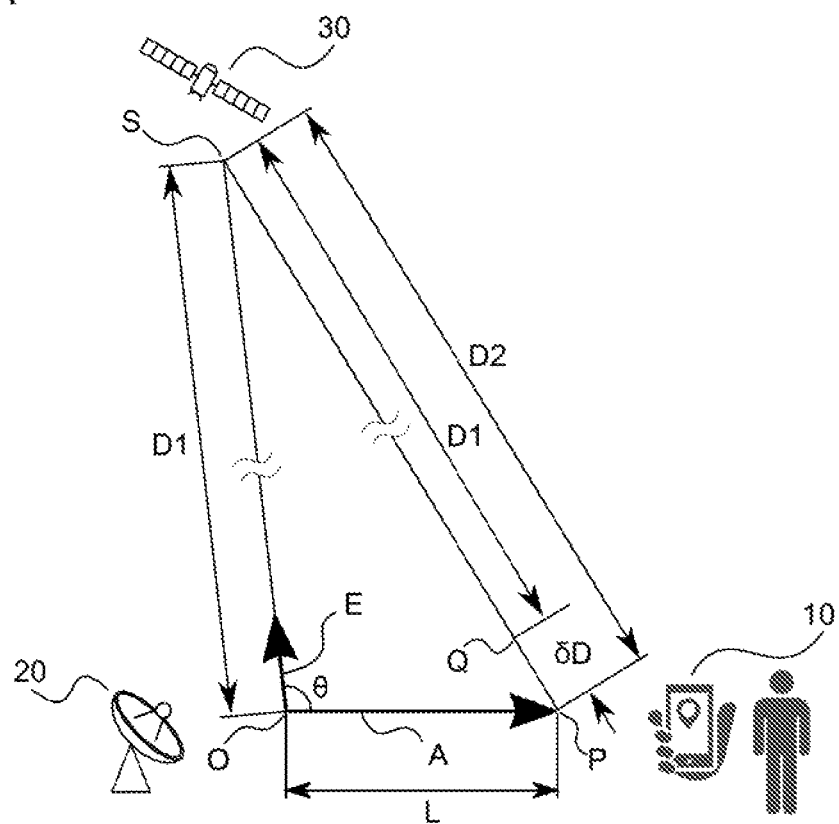
FIG. 6A is a diagram illustrating a unit line-of-sight vector E and a baseline vector A in differential GPS method, which is the principle of the Real Time Kinematic satellite positioning system according to the present embodiment.
Figure 6B:
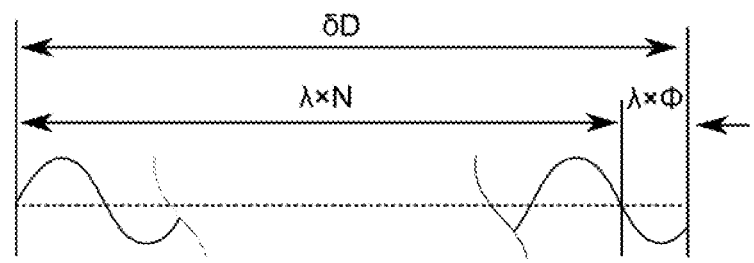
FIG. 6B is a diagram illustrating an integer bias in differential GPS method, which is the principle of the Real Time Kinematic satellite positioning system according to the present embodiment.

With reference to FIGS. 6A and 6B, the principle of differential GPS method in a real-time positioning system according to the present embodiment will be described. As shown in FIG. 6A, the position of the transmitting station 20 is a reference point O, the position of the mobile station 10 is P, and the position of the Internet satellite 30 is S. As noted above, the differential GPS method uses at least four Internet satellites 30, only one of which is shown here.

Let L be the linear distance from the reference point O to the position P of the mobile station 10, and let the baseline vector A be a vector starting at the reference point O and ending at the position P of the mobile station 10. The unit vector starting at the reference point O and pointing toward the position S of the Internet satellite 30 is the unit line-of-sight vector E. Let θ be the angle between the unit line-of-sight vector E and the baseline vector A. The position S of the Internet satellite 30 is actually the position of the antenna on the Internet satellite 30. The position P of the mobile station 10 is actually the position of the antenna on the mobile station 10.

Let D1 be the distance from the position S of the internet satellite 30 to the reference point O, and let D2 be the distance from the position S of the internet satellite 30 to the position P of the mobile station 10. Let the path difference be δD.

$$\delta D = D2 - D1 \qquad \text{Formula 1}$$

The three-dimensional position coordinates (x, y, z) of the reference point O are obtained by the transmitting station 20 in advance. The three-dimensional position coordinates of the Internet satellites 30 are obtained from the orbit information. That is, the distance D1 is calculated from the reference point O and the position S of the Internet satellite 30. Therefore, if the path difference δD is obtained, the distance D2 can be obtained. The position P of the mobile station 10 is on a spherical surface with a radius D2 centered on the position S of the Internet satellite 30. The position P of the mobile station 10 is the intersection of spherical surfaces with a radius D2 centered on the position S of the four Internet satellites 30. Therefore, by solving the simultaneous equations, the position P of the mobile station 10 can be obtained.

As shown in FIG. 6B, the path difference δD is expressed as the product of the wavelength, of the sine wave and the wave number (N+Φ).

$$\delta D = (N + \Phi)\lambda \qquad \text{Formula 2}$$

N is the integer part of the wavenumber and Φ (Phi) is the fractional part of the wavenumber. The fractional portion Φ (Phi) of the wavenumber is greater than 0 and less than 1. The integer part N of the wavenumber is referred to as an integer value bias or an integer value ambiguity. The step of determining the integer value bias is referred to as an initialization process. The real value of the wavenumber (sum of integer and fractional part) is called the float solution, and the integer part of the wavenumber, i.e. the integer value bias, is called the fix solution. The time until a fix solution is obtained is called the initialization time.

In differential GPS method, a "phase" is used instead of a "wavenumber". In general, as a unit of the phase of the sine wave, the angle (0 to 360 degrees) or radian (0 to 2π) is used, but in the differential GPS method, cycles (0 to 1) are used. For example, when the phase difference of the carrier waves is 5.2, the integer bias is 5 and the fraction is 0.2.

The carrier waves received by the mobile station 10 and the transmitting station 20 include errors due to ionospheric delays and troposphere delays. However, since the path from the Internet satellite 30 to the mobile station 10 and the path from the Internet satellite 30 to the transmitting station 20 are substantially identical, the ionospheric delay and the troposphere delay included in the two carrier waves may be considered identical. Thus, these delay amounts are erased by subtraction in Equation 1, which determines the path difference δD.

Here, the position coordinates of the mobile station 10 were determined using the position of the transmitting station 20 as a reference point O. Therefore, when the reference point O is the position of the reference station 40, the position of the transmitting station 20 can be determined.

Figure 7A:
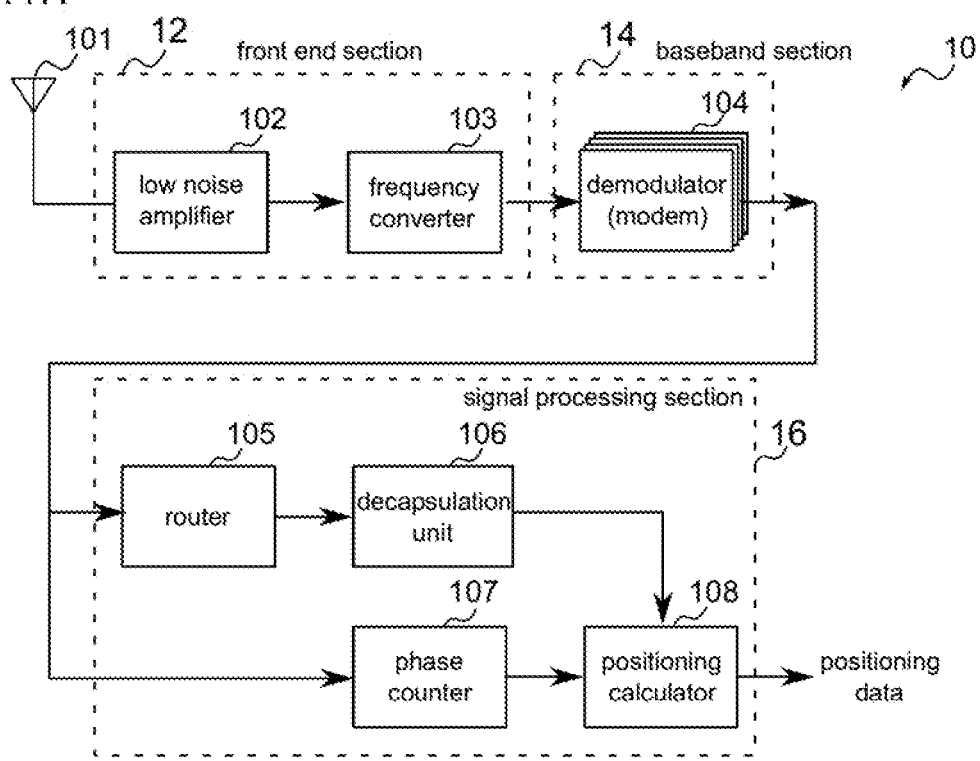
FIG. 7A is a diagram illustrating a configuration example of a reception system of a mobile station of the Real Time Kinematic satellite positioning system according to the present embodiment.

With reference to FIG. 7A, an example of the configuration of the reception system of the mobile station 10 according to this embodiment will be described. The reception system of the mobile station 10 includes an antenna 101, a front end section 12, a baseband section 14, and a signal processing section 16. Antenna 101 receives carrier waves multicast from Internet satellites 30. The front end section 12 generates an intermediate frequency carrier wave from the high frequency carrier wave received by the antenna 101. The baseband section 14 digitally demodulates the intermediate frequency carrier wave and generates a datagram which is a UDP packet. The signal processing section 16 generates positioning data, that is, the position of the mobile station 10, from the datagram.

The front end section 12 includes a low noise amplifier 102 and a frequency converter 103. The low noise amplifier 102 amplifies a weak high frequency carrier wave with low noise. The frequency converter 103 converts a high frequency carrier wave into an intermediate frequency carrier wave. This intermediate frequency carrier wave is sometimes called a beat signal. The baseband section 14 includes a demodulator (modem) 104 and a correlator (not shown).

The demodulator 104 digitally demodulates the intermediate frequency carrier wave to generate a digital received signal, i.e. a datagram.

The signal processing section 16 includes a router 105, a decapsulation unit 106, a phase counter 107, and a positioning calculator 108. The router 105 has a function of selecting a route or sorting packets in the Internet layer. As described with reference to FIG. 4A, the header of an IP packet includes a source address, a destination address, and the like. If the router 105 determines that the destination address is inappropriate, the router 105 discards the packet and notifies the source address of this fact.

The router 105 inputs the datagram from the baseband section 14 and outputs an IP packet. The decapsulation unit 106 decapsulates the IP packet via the router 105 and retrieves the received data. The received data includes the orbit information of the Internet satellites 30, the location information of the transmitting station 20 and the atomic clock time. The phase counter 107 inputs the datagram from the baseband section 14 and counts the phase difference of the carrier waves. The positioning calculator 108 calculates the location information of the mobile station 10 from the phase difference of the carrier waves and the received data.

Although FIG. 7A shows a configuration example of the reception system of the mobile station 10, the reception system of the reference station 40 may have a similar configuration.

Figure 7B:
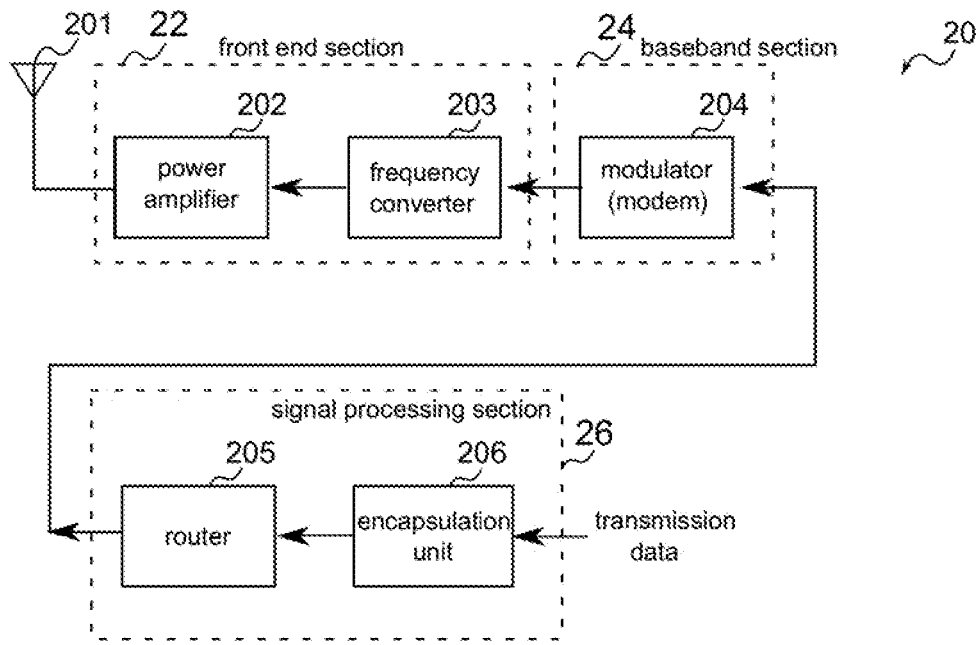
FIG. 7B is a diagram illustrating a configuration example of a transmitting station (earth station) of the Real Time Kinematic satellite positioning system according to the present embodiment.

With reference to FIG. 7B, an example of a configuration of a transmitting station (earth station) according to the present embodiment will be described. The transmitting station 20 includes an antenna 201, a front end section 22, a baseband section 24, and a signal processing section 26. The antenna 201 multicasts a carrier wave toward Internet satellites 30. The front end section 22 generates a high frequency carrier wave from an intermediate frequency carrier wave. The baseband section 24 digitally modulates the transmission datagram to generate an intermediate frequency carrier wave. The signal processing section 26 generates a datagram including a transmission data. This transmission data includes the orbit information of the Internet satellites 30, the location information of the transmitting station 20 and the atomic clock time.

The front end section 22 includes a power amplifier 202 and a frequency converter 203. The power amplifier 202 amplifies the high frequency carrier wave to a high power level of several hundred watts. The frequency converter 203 converts an intermediate frequency carrier wave into a high frequency carrier wave. The baseband section 24 includes a modulator (modem) 204. The modulator 204 digitally modulates the datagram to an intermediate frequency carrier wave. In the present embodiment, the digital modulation system may be any phase shift keying system, but is preferably a binary phase shift keying (BPSK) system.

The signal processing section 26 includes a router 205 and an encapsulation unit 206. The router 205 inputs the IP packet and outputs the datagram. The router 205 refers to the header of the IP packet to determine route selection and whether transfer is possible. The encapsulation unit 206 encapsulates the transmission data and generates a IP packet. The transmission data includes the orbit information of the Internet satellites 30, the location information of the transmitting station 20 and the atomic clock time.

Figure 7C:
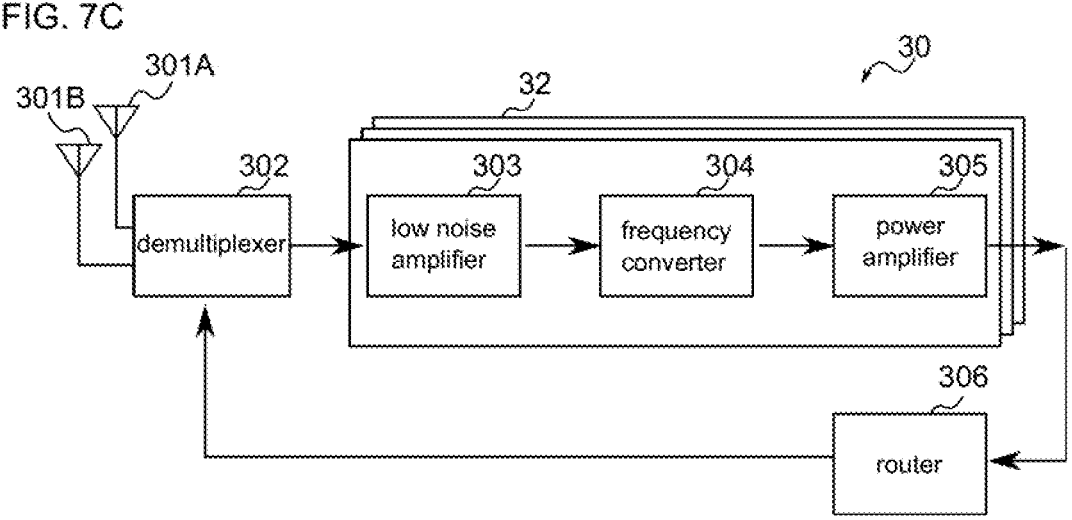
FIG. 7C is a diagram illustrating a configuration example of an Internet satellite of the Real Time Kinematic satellite positioning system according to the present embodiment.

With reference to FIG. 7C, an exemplary configuration of an Internet satellite 30 according to the present embodiment will be described. The Internet satellite 30 has antennas 301A and 301B, a demultiplexer 302, a plurality of repeaters 31, attitude sensors (star trackers), and the like. Each repeater 31 has a low noise amplifier 303, a frequency converter 304, a power amplifier 305, and a router 306. Here, the receiving antenna 301A and the transmitting antenna 301B may be provided, but one antenna for receiving and transmitting may be used.

The demultiplexer 302 demultiplexes the carrier waves received by the receiving antenna 301A into each frequency, and distributes the demultiplexed waves to the repeaters for each frequency. The low noise amplifier 303 amplifies a weak carrier wave with low noise. The frequency converter 304 converts the frequency of the carrier wave from the uplink frequency to the downlink frequency. For example, if the Ku band (14/12 GHz) is used as the carrier waves, the frequency converter 304 converts the frequency from 14 GHz to 12 GHz. The power amplifier 305 amplifies the power of the carrier wave. Typically, the satellite output power is tens of watts to hundreds of watts. It should be noted that a band filter may be provided between the frequency converter 304 and the power amplifier 305. The carrier wave from the power amplifier 305 is transmitted to the demultiplexer 302 via the router 306. The carrier wave is broadcast via the transmitting antenna 301B.

While the positioning system according to the present embodiment has been described above, these are merely examples and do not limit the scope of the present invention. Additions, deletions, changes, improvements, etc. that can be easily made to this embodiment by those skilled in the art are within the scope of the present invention. The scope of the invention is defined by the following claims.

EXPLANATION OF REFERENCE NUMERALS

10_mobile station (rover), 12_front end section, 14_baseband section, 16_signal processing section, 20_transmitting station (earth station), 22_front end section, 24_baseband section, 26_signal processing section, 30_Internet (IN) satellite, 31_repeater, 40_reference station, 50_GNSS satellite, 60_IPsec-VPN, 101_antenna, 102_low noise amplifier, 103_frequency converter, 104_demodulator (modem), 105_router, 106_decapsulation unit, 107_phase counter, 108_positioning calculator, 201_antenna, 202_power amplifier, 203_frequency converter, 204_modulator (modem), 205_router, 206_encapsulation unit, 301A, 301B_antenna, 302_demultiplexer, 303_low noise amplifier, 304_frequency converter, 305_power amplifier, 306_router

The invention claimed is:

1. A Real Time Kinematic satellite positioning system that has a mobile station of a user and a transmitting station installed on the ground, and performs positioning using Internet satellites flying above the sky, the positioning system using differential GPS method,
the transmitting station comprising:
a signal processing section of a transmission system that generates a transmission datagram, the transmission datagram including a transmission data, the transmission data including orbit information of predetermined Internet satellites, location information of the transmitting station and atomic clock time;
a baseband section of the transmission system that digitally modulates the transmission datagram to generate an intermediate frequency carrier wave;
a front end section of the transmission system that frequency converts the intermediate frequency carrier wave to generate a high frequency carrier wave; and
an antenna of the transmission system that multicasts the high frequency carrier wave toward the predetermined Internet satellites; and
the signal processing section of the transmission system comprising:
an encapsulation unit that encapsulates the transmission data to generate a transmission IP packet; and
a router of the transmission system that inputs the transmission IP packet and outputs the transmission datagram,
the mobile station comprising:
an antenna of a reception system that receives a high frequency carrier wave, the high frequency carrier wave being multicast from the predetermined Internet satellites;
a front end section of the reception system that converts the frequency of the high frequency carrier wave to an intermediate frequency;
a baseband section of the reception system that digitally demodulates the intermediate frequency carrier wave to generate a received datagram; and
a signal processing section of the reception system that calculates the position of the mobile station from the received datagram,
the signal processing section of the reception system comprising:
a phase counter configured to calculate, for each of the predetermined Internet satellites, a phase difference between the carrier wave multicast by the transmitting station toward the respective predetermined Internet satellite and the carrier wave multicast from the respective predetermined Internet satellite to the mobile station, the phase difference being calculated based on the received datagram, and the phase difference being indicative of a difference between (i) a distance from the respective predetermined Internet satellite to the transmitting station and (ii) a distance from the respective predetermined Internet satellite to the mobile station;
a router of the reception system that inputs the received datagram and outputs a received IP packet;
a decapsulation unit that decapsulates the received IP packet and extracts a received data, the received data including the orbit information of the predetermined Internet satellites, the location information of the transmitting station and the atomic clock time; and
a positioning calculator that calculates the position of the mobile station based on the received data and the phase difference,
wherein the mobile station, the transmitting station, and the predetermined Internet satellites are connected to each other by IPsec-VPN, the predetermined Internet satellites including at least four Internet satellites.

2. The Real Time Kinematic satellite positioning system according to claim 1,
wherein the atomic clock time is obtained from a GNSS satellite flying above the sky.

3. The Real Time Kinematic satellite positioning system according to claim 1,
the predetermined Internet satellites being non-geostationary low Earth orbit satellites, the non-geostationary low Earth orbit satellites constituting a satellite constellation consisting of a plurality of satellites.

4. The Real Time Kinematic satellite positioning system according to claim 1,
wherein the digital modulation is binary phase shift keying (BPSK).

5. The Real Time Kinematic satellite positioning system according to claim 1,
wherein the transmitting station obtains its own location information from reference point information and orbit information of the predetermined Internet satellites, the reference point information being obtained from a reference station within 10 km from the transmitting station.

6. The Real Time Kinematic satellite positioning system according to claim 1,
wherein the positioning system further comprises an orbit tracking station on the ground, and
wherein the orbit information of the predetermined Internet satellites is orbit information calculated in real time by the orbit tracking station on the ground.

7. The Real Time Kinematic satellite positioning system according to claim 1,
wherein the frequency band of the carrier waves multicast toward the predetermined Internet satellites and the carrier wave multicast from the predetermined Internet satellites is the Ku band.

8. A Real Time Kinematic satellite positioning method that uses a user's mobile station and a transmitting station installed on the ground, and performs positioning using Internet satellites flying above the sky, the positioning method using differential GPS method,
the positioning method comprising:
   a step of capsulating, by the transmitting station, a transmission data including orbit information of predetermined Internet satellites, location information of the transmitting station and atomic clock time to generate a transmission IP packet;
   a step of generating, via a router of a transmission system, a transmission datagram from the transmission IP packet, and multicasting a carrier wave including the transmission datagram toward the predetermined Internet satellites;
   a step of converting, by the predetermined Internet satellites, the frequency of a carrier wave multicast from the transmitting station from an uplink frequency to a downlink frequency;
   a step of multicasting, by the predetermined Internet satellites, the carrier wave converted to the downlink frequency to the mobile station;
   a step of generating, by the mobile station, a received datagram from the carrier wave multicast from the predetermined Internet satellites, generating, via a router of a reception system, a received IP packet from the received IP datagram, and decapsulating the received IP packet
   to extract a received data including the location information of the transmitting station, the orbit information of the predetermined Internet satellites and the atomic clock time;
   a step of calculating, by the mobile station, for each of the predetermined Internet satellites, a phase difference between the carrier wave multicast by the transmitting station toward the respective predetermined Internet satellite and the carrier wave multicast from the respective predetermined Internet satellite to the mobile station, the phase difference being indicative of a difference between (i) a distance from the respective predetermined Internet satellite to the transmitting station and (ii) a distance from the respective predetermined Internet satellite to the mobile station
   a step of calculating, by the mobile station, the position of the mobile station from the received data and the phase difference,
wherein the mobile station, the transmitting station, and the predetermined Internet satellites are connected to each other by IPsec-VPN, the predetermined Internet satellites including at least four Internet satellites.

9. The Real Time Kinematic satellite positioning method according to claim 8,
wherein the predetermined Internet satellites being non-geostationary low Earth orbit satellites, the non-geostationary low Earth orbit satellites
constituting a satellite constellation consisting of a plurality of satellites.

10. The Real Time Kinematic satellite positioning method according to claim 8,
wherein the atomic clock time is obtained from a GNSS satellite flying above the sky.

11. The Real Time Kinematic satellite positioning method according to claim 8,
wherein the frequency band of the carrier waves multicast toward the predetermined Internet satellites and the carrier wave multicast from the predetermined Internet satellites is the Ku band.

\* \* \* \* \*